US012665741B2

(12) United States Patent
Hamburg et al.

(10) Patent No.: US 12,665,741 B2
(45) Date of Patent: Jun. 23, 2026

(54) PROTECTION OF SECRET DATA USING UNPROTECTED DATA PATH

(71) Applicant: CRYPTOGRAPHY RESEARCH, INC., San Jose, CA (US)

(72) Inventors: Michael Alexander Hamburg, 's-Hertogenbosch (NL); Begül Bilgin, Kessel-Lo (BE)

(73) Assignee: CRYPTOGRAPHY RESEARCH, INC., San Jose, CA (US)

( * ) Notice: Subject to any disclaimer, the term of this patent is extended or adjusted under 35 U.S.C. 154(b) by 55 days.

(21) Appl. No.: 18/646,554

(22) Filed: Apr. 25, 2024

(65) Prior Publication Data

US 2024/0364497 A1     Oct. 31, 2024

Related U.S. Application Data

(60) Provisional application No. 63/462,824, filed on Apr. 28, 2023.

(51) Int. Cl.
*H04L 9/06*          (2006.01)
(52) U.S. Cl.
CPC ................................ *H04L 9/0618* (2013.01)
(58) Field of Classification Search
CPC ..... H04L 9/0618; H04L 9/0643; H04L 9/003; H04L 2209/08; H04L 2209/046; G09C 1/00
See application file for complete search history.

(56) References Cited

U.S. PATENT DOCUMENTS

| | | | | |
|---|---|---|---|---|
| 6,681,213 B2 * | 1/2004 | Fujimori | ............. | H04L 63/0428 |
| | | | | 713/153 |
| 7,849,310 B2 * | 12/2010 | Watt | .................... | G06F 9/45558 |
| | | | | 726/28 |
| 9,143,325 B2 * | 9/2015 | Chen | ........................ | G06F 7/724 |
| 9,569,616 B2 * | 2/2017 | Leiserson | ............... | G06F 21/71 |
| 10,320,554 B1 | 6/2019 | Pedersen | | |
| 10,735,179 B2 * | 8/2020 | Nguyen | .................. | H04L 9/008 |
| 11,070,373 B2 * | 7/2021 | Chan | ........................ | G06F 21/75 |
| 11,418,321 B2 | 8/2022 | Wyseur | | |
| 2006/0167784 A1 * | 7/2006 | Hoffberg | ............... | H04W 4/029 |
| | | | | 705/37 |
| 2008/0052532 A1 * | 2/2008 | Akkar | .................... | G06F 9/3004 |
| | | | | 711/E12.1 |
| 2010/0257373 A1 * | 10/2010 | Motoyama | ............ | G06F 21/755 |
| | | | | 713/189 |

(Continued)

*Primary Examiner* — Mohammad A Siddiqi
(74) *Attorney, Agent, or Firm* — Lowenstein Sandler LLP

(57)          ABSTRACT

Disclosed systems and techniques include a cryptographic processor for processing of both unprotected data and protected data using an unprotected data path. In one implementation, the cryptographic processor includes a processing unit, and a control unit to selectively cause the processing unit to operate in a public mode or a secure mode. In the public mode, the processing unit performs a computational operation to compute a nonlinear function of a public data. In the secure mode, the processing unit computes, over a plurality of iterations, a plurality of shares of the nonlinear function of a secure data. At each iteration, the processing unit performs multiple instances of the computational operation to compute a respective share of the nonlinear function of the secure data.

20 Claims, 6 Drawing Sheets

(56)     References Cited

U.S. PATENT DOCUMENTS

| | | | |
|---|---|---|---|
| 2010/0318811 A1* | 12/2010 | Motoyama | G06F 7/00 |
| | | | 708/250 |
| 2015/0381351 A1* | 12/2015 | Kuenemund | G06F 21/72 |
| | | | 713/189 |
| 2016/0085955 A1* | 3/2016 | Lerner | H04L 9/0869 |
| | | | 726/20 |
| 2016/0092688 A1* | 3/2016 | Wolrich | G06F 9/30007 |
| | | | 713/190 |
| 2018/0129826 A1* | 5/2018 | Kim | H04L 9/14 |
| 2019/0050570 A1* | 2/2019 | Kannan | G06F 21/79 |
| 2019/0164153 A1* | 5/2019 | Agrawal | G06Q 20/065 |
| 2022/0006835 A1* | 1/2022 | Gray | H04L 9/0838 |
| 2022/0416998 A1* | 12/2022 | Ghosh | H04L 9/002 |
| 2023/0093306 A1* | 3/2023 | Hamburg | H04L 9/004 |
| | | | 713/189 |

* cited by examiner

100

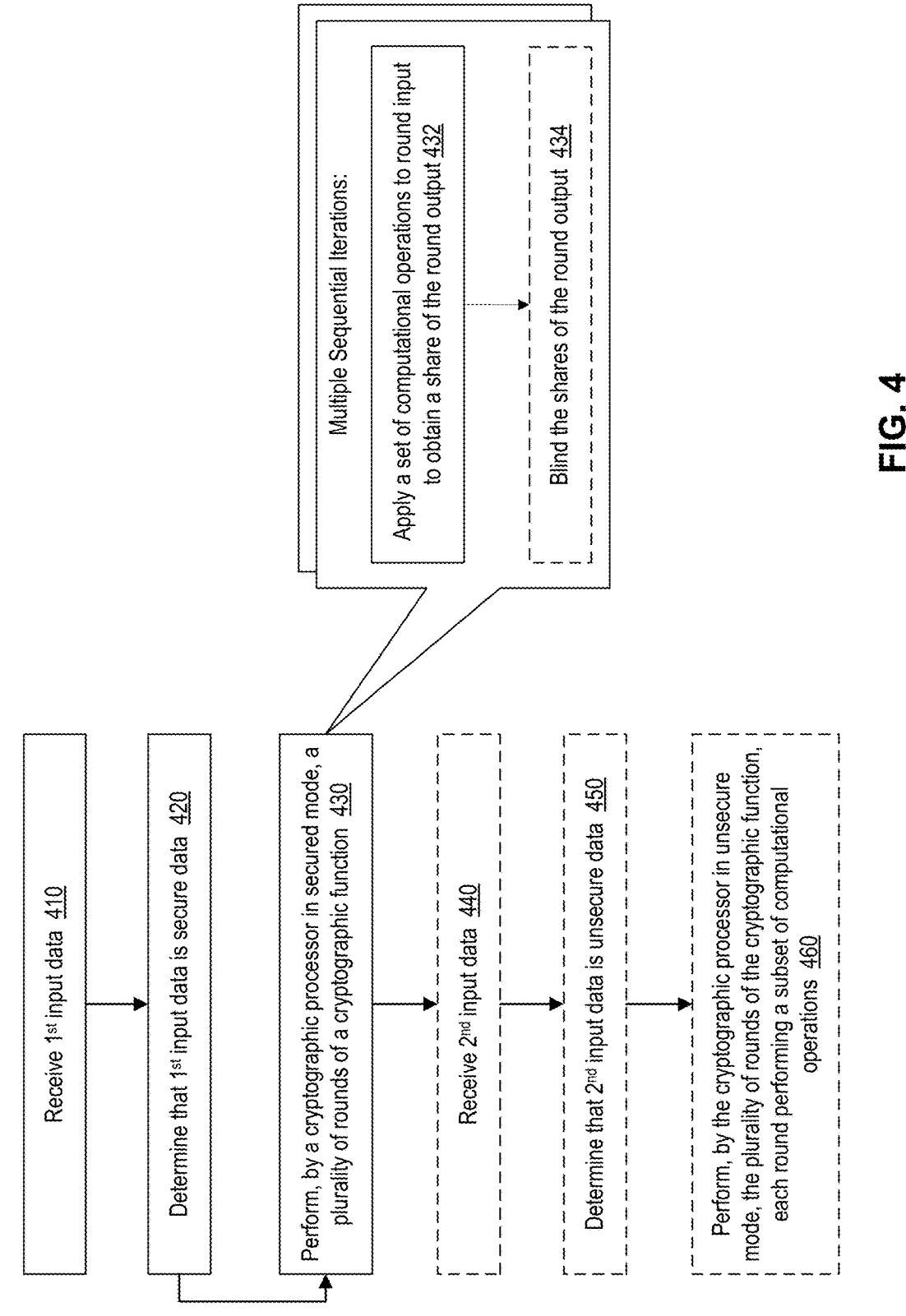

400

Receive 1st input data 410

Determine that 1st input data is secure data 420

Perform, by a cryptographic processor in secured mode, a plurality of rounds of a cryptographic function 430

Multiple Sequential Iterations:

Apply a set of computational operations to round input to obtain a share of the round output 432

Blind the shares of the round output 434

Receive 2nd input data 440

Determine that 2nd input data is unsecure data 450

Perform, by the cryptographic processor in unsecure mode, the plurality of rounds of the cryptographic function, each round performing a subset of computational operations 460

FIG. 4

PROTECTION OF SECRET DATA USING UNPROTECTED DATA PATH

RELATED APPLICATIONS

This application claims the benefit of U.S. Provisional Patent Application No. 63/462,824, filed Apr. 28, 2023, entitled "PROTECTION OF SECRET DATA USING UNPROTECTED DATA PATH," the contents of which is incorporated herein by reference.

TECHNICAL FIELD

The present disclosure is directed to protection, against side-channel attacks, of confidential information processed and stored in computing systems. More specifically, aspects of the present disclosure are directed to efficient handling of secure data in a way that prevents an attacker from collecting data sufficient for successful identification of the confidential information.

BRIEF DESCRIPTION OF THE DRAWINGS

The present disclosure will be understood more fully from the detailed description given below and from the accompanying drawings of various implementations of the disclosure.

FIG. 4 is a flow diagram of an example method of operating a cryptographic processor for processing of both unprotected data and protected data using an unprotected data path, in accordance with some implementations of the present disclosure.

DETAILED DESCRIPTION

Figure 1:
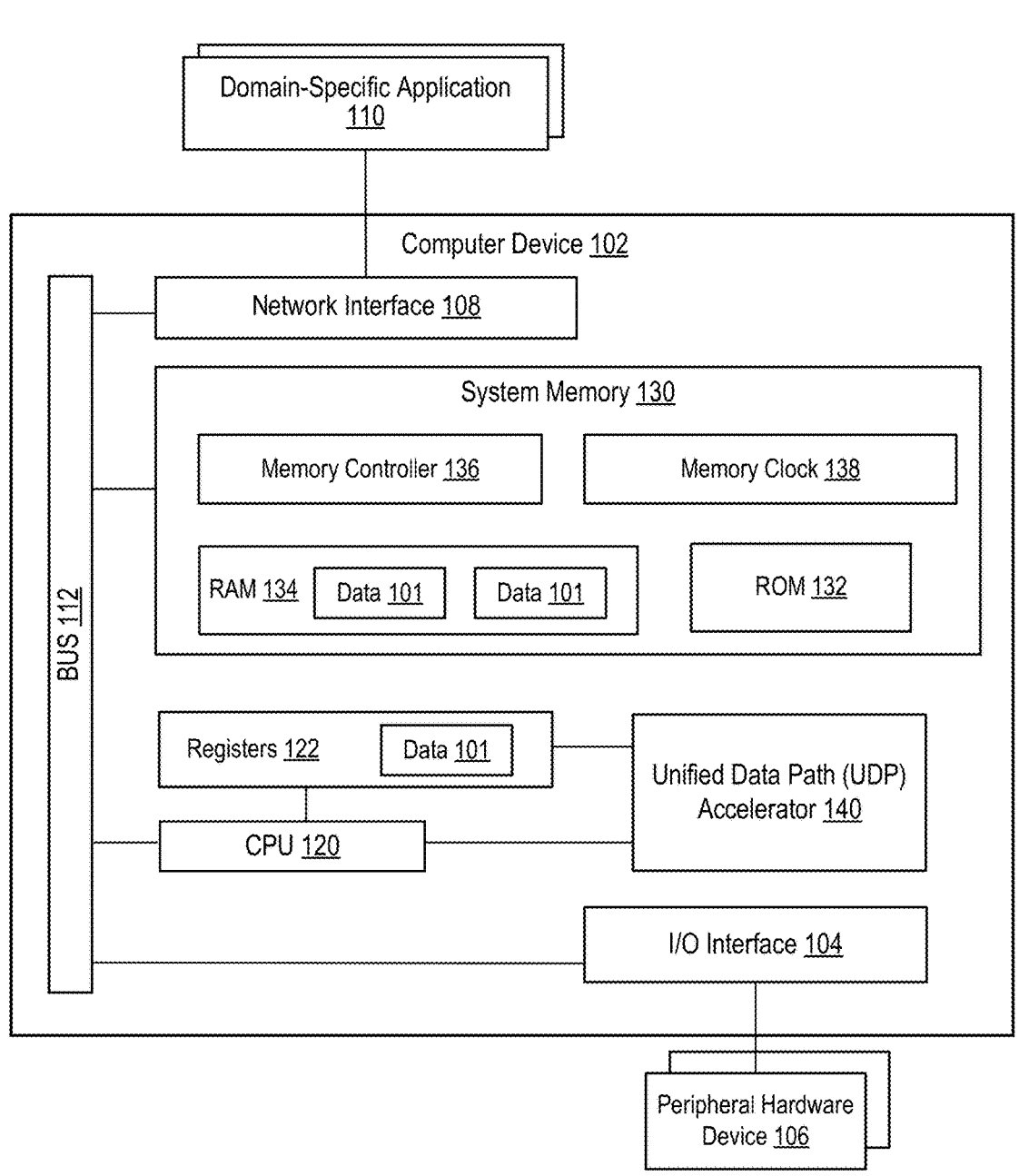
FIG. 1 is a block diagram illustrating an example system architecture in which implementations of the present disclosure may operate.

Modern computational and data-storing applications often operate with information that is maintained in secrecy. Such confidential information may include cryptographic keys, secret messages that need to be protected from unauthorized accesses, as well as various other secret data. Storing in memory devices for a significant amount of time and communicating repeatedly the same confidential information over physical communication channels (e.g., buses and interconnect lines) makes the information vulnerable to malicious or unauthorized attacks. Even where a cryptographic algorithm is sufficiently resilient against computational attempts to break a cryptographic key, such resilience may not be sufficient if the key is exposed to a physical attack. A side-channel attack may be performed by monitoring physical emissions produced by electronic circuits of the targeted device. Such emissions may be of acoustic, electric, magnetic, optical, thermal types, and so on. In one example, a laser voltage (laser timing) probing technique may involve monitoring a bus or another interconnect by a spectrograph that uses a laser to determine variations of the optical response (e.g., reflectivity) while a sequence of bits of secret information is being communicated. If the same sequence of bits is communicated repeatedly, an attacker can correlate variations in the optical response of the bus (or the memory device itself) with bits (zeros and ones) of the secret information using differential power analysis (DPA) techniques. Upon collecting a sufficient amount of statistical correlations, the attacker may be able to uncover secret information.

Protection against DPA attacks includes blinding (masking) a secret data (value) S by representing the secret data via multiple shares $\{S_i\}$ that add up to the secret value, $S=S_1+S_2+\ldots$. In some instances, the addition operations + may be XOR operations (additions modulo 2) denoted herein via symbol $\oplus$. An affine function $Y=aS+b$ may be applied to shares $S_i$ with the outputs being shares of Y, with each share $Y_i=aS_i+b$ determined by a corresponding single value $S_i$. A nonlinear operation $Y=F(S)$ may also be computed as a sum of shares, $Y=Y_1+Y_2+\ldots$, where, however, each share $Y_j$ may have to be computed using multiple shares $S_j$. The number of computations grows quickly with the number of shares. For example, computing a quadratic function $F(S)=S^T \cdot a \cdot S+b \cdot S+c$ when the secret data is split into three shares may involve computing at least six instances of the function $F(\ )$ computing the same function when the secret data is split into five shares may involve computing at least fifteen instances of the function $F(\ )$ and so on.

Hardware cryptographic accelerators often facilitate such nonlinear computations via a data path designed for a specific fixed number of shares. Such accelerators are efficient provided that the same number of shares is used for most cryptographic operations. However, not all use cases have this property. Some values may be more confidential and, therefore, may call for more blinding (e.g., more shares) than other values. Some values may be equally secret as other values but may be more vulnerable to side-channel analysis (e.g., due to a higher rate of use and, correspondingly, exposure). Hardware circuits that are designed for a maximum number of shares may thus be significantly underutilized for a large fraction (if not most) of operating time. Additionally, hardware devices with a large number of circuits operating in parallel are expensive in terms of the processing area and complex in operation.

Aspects and implementations of the present disclosure address these and other challenges of the existing technology by providing for systems and techniques that execute both protected (with split shares) and unprotected (without split shares) nonlinear computations using a unified data path. In some implementations, a hardware accelerator with a low number of instances (e.g., two or even one) of circuits that compute nonlinear functions may be used, with various such computations being performed sequentially, as described in more detail below. In many applications (e.g., those using in Keccak, Ascon, Xoodyak, and other cryptographic algorithms), most computations may be unprotected with only a small portion of computations requiring splitting values into shares. Accordingly, deploying an accelerator with a low number of circuits sufficient for supporting an unprotected data and using it multiple times for split share computations, in those instances where such splitting is desired, increases processing time only insignificantly while substantially reducing costs of accelerators and complexity of their deployment.

The advantages of the disclosed implementations include, but are not limited to, decreasing costs and complexity of cryptographic accelerators (processors) capable of area-efficient operations on both protected and unprotected data. Additional advantages include a possibility of flexible protection of data having different levels of security with different number of shares using the same accelerator circuitry (or a software code).

FIG. 1 is a block diagram illustrating an example computer system 100 in which various implementations of the present disclosure may operate. The example computer system 100 may be a part of desktop computer, a tablet, a smartphone, a server (local or remote), a thin/lean client, and the like. The example computer system 100 may include, but not be limited to, a computer device 102 having one or more processors (e.g., capable of executing binary instructions) such as central processing units (CPUs) 120, one or more graphics processing units (not shown), one or more crypto-graphic accelerators, and one or more system memory 130 devices. "Processor" may further refer to any device capable of executing instructions encoding arithmetic, logical, or I/O operations. In one illustrative example, a processor may follow von Neumann architectural model and may include an arithmetic logic unit (ALU), a control unit, and a plurality of registers.

Computer device 102 may further include an input/output (I/O) interface 104 to facilitate connection of computer device 102 to peripheral hardware devices 106 such as card readers, terminals, printers, scanners, internet-of-things devices, and the like. Computer device 102 may further include a network interface 108 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from computer device 102. Various hardware components of computer device 102 may be connected via a bus 112, which may have its own logic circuits, e.g., a bus interface logic unit.

CPU 120 may include one or more processor cores having access to a single or multi-level cache and one or more hardware registers. In implementations, each processor core may execute instructions to run a number of hardware threads, also known as logical processors. Various logical processors (or processor cores) may be assigned to one or more applications 110, although more than one processor core (or a logical processor) may be assigned to a single application for parallel processing. A multi-core CPU 120 may simultaneously execute multiple instructions. A single-core CPU 120 may typically execute one instruction at a time (or process a single pipeline of instructions). CPU 120 may be implemented as a single integrated circuit, two or more integrated circuits, or may be a component of a multi-chip module. CPU 120 may have access to registers 122 (e.g., fast-speed cache).

Computer system 100 may be a system supporting one or more domain-specific applications 110, e.g., user authentication applications, banking applications, data processing applications, and so on. Some of applications 110 may be cryptographic applications or applications deploying methods of cryptographic protection and applications that use neural networks. Application(s) 110 may be instantiated on the same computer device 102, e.g., by an operating system executed by CPU 120 and residing in the system memory 130. Alternatively, application(s) 110 may be instantiated using virtual machine infrastructure supported by CPU 120. In some implementations, application(s) 110 may reside on a remote access client device or a remote server (not shown), with computer device 102 providing computational support for the client device and/or the remote server.

System memory 130 may refer to a volatile or non-volatile memory and may include a read-only memory (ROM) 132, a random-access memory (RAM) 134, and various other memory devices not explicitly depicted in FIG. 1, such as electrically-erasable programmable read-only memory (EEPROM), flash memory, flip-flop memory, or any other device capable of storing data. RAM 134 may be a dynamic random-access memory (DRAM), synchronous DRAM (SDRAM), a static memory, such as static random-access memory (SRAM), and the like. Data 101 stored in various memory devices of computer device 102, including RAM 134, registers 122, and other memory devices may include any data from application(s) 110 as well as data used by any other component or process of computer device 102. Data 101 may include both open (public) information and secret information, which may include various cryptographic keys, and/or any information protected with such keys (digital signatures, message authentication codes, encrypted data, etc.). System memory 130 may include a memory controller 136, which may control memory read, write, erase, etc., operations performed in system memory 130, and internal memory clock 138, which may operate (for additional protection against outside attacks) independently from an outside clock, e.g., a clock of computer device 102.

Computer device 102 may include a unified data path (UDP) accelerator 140 that may operate in conjunction with (and under instructions from CPU 120) and may include a set of dedicated circuits performing repeated computations frequently encountered by CPU 120. In some implementations, UDP accelerator 140 may use a unified data path for both public data (e.g., data that is not protected by splitting into shares) and secure data (e.g., data that is split into shares). In one example non-limiting implementation, UDP accelerator 140 may split secret data S into three shares $S = S_1 + S_2 + S_3$ and may compute a quadratic function $F(S) = S^T \cdot a \cdot S + b \cdot S + c$ with constant coefficients a, b, and c (which can be matrices). In some implementations, the data (and shares) may be defined on a Galois field $GF(2^m)$ and the addition operations may be XOR operations. UDP accelerator 140 may compute the quadratic function F(S) by computing multiple instances of incomplete functions operating on fewer than three shares, e.g., using the identify $$F(S) = F(S_1 + S_2) + F(S_2 + S_3) + F(S_3 + S_1) - F(S_1) - F(S_2) - F(S_3) + F(0).$$

(In the instances of XOR operations, additions and subtractions are performed using the same operation $\oplus$. A similar formula may be obtained by splitting into computations of the form $F(S_1 - S_2)$; this gives the same result when using XOR operations.) When secret data is split into four shares, $S = S_1 + S_2 + S_3 + S_4$, the function F(S) may be computed as $$F(S) = F(S_1 + S_2) + F(S_1 + S_3) + F(S_1 + S_4) + F(S_2 + S_3) +$$

$$F(S_2 + S_4) + F(S_3 + S_4) - 2 \cdot (F(S_1) + F(S_2) + F(S_3) - F(S_4)) + 3 \cdot F(0).$$

(In the instances of XOR operations, the doubled terms are equal to zero and thus may be omitted.) Similarly, the function F(S) may be computed for any number of shares, $S=S_1+ \ldots +S_N$, as follows, $$F(S) = \sum_{1 \le i < j \le N} F(S_i + S_j) - (N-2) \cdot \sum_{1 \le i \le N} F(S_i) + \frac{(N-1)(N-2)}{2} \cdot F(0).$$

This includes $$\frac{N \cdot (N-1)}{2}$$

calculations of using two shares, at most N calculations using one share, and at most one addition of a multiple of the constant value F(0).

Correspondingly, the function F(S) may be efficiently computed over a number of sequential iterations, each iteration computing multiple values of the function. For example, for three shares of S, three shares of the function $F(S)=Y_1+Y_2+Y_3+F(0)$ may be computing over three iterations, $$Y_1 = F(S_1 + S_2) - F(S_1),$$

$$Y_2 = F(S_2 + S_3) - F(S_2),$$

$$Y_3 = F(S_3 + S_1) - F(S_3).$$

Each iteration j (with two instances of function F( ) per iteration) computing a respective share $Y_j$ involves only $N-1=2$ shares thus satisfying the condition of incompleteness. An attacker that successfully determines all shares $S_i$ involved in the computations of a single iteration still cannot recover the secret value S (since one share remains unknown). Similarly, for five shares of S, five shares of the function $F(S)=Y_1+Y_2+Y_3+Y_4+Y_5+F(0)$ may be computed over five iterations, $$Y_1 = F(S_1 + S_2) - 3 \cdot F(S_1) + F(S_1 + S_3),$$

$$Y_2 = F(S_2 + S_3) - 3 \cdot F(S_2) + F(S_2 + S_4),$$

$$Y_3 = F(S_3 + S_4) - 3 \cdot F(S_3) + F(S_3 + S_5),$$

$$Y_4 = F(S_4 + S_5) - 3 \cdot F(S_4) + F(S_4 + S_1),$$

$$Y_5 = F(S_5 + S_1) - 3 \cdot F(S_5) + F(S_5 + S_2)$$

with each iteration j (three instances of function F( ) per iteration) involving only 3 shares $S_j$.

Figure 2:
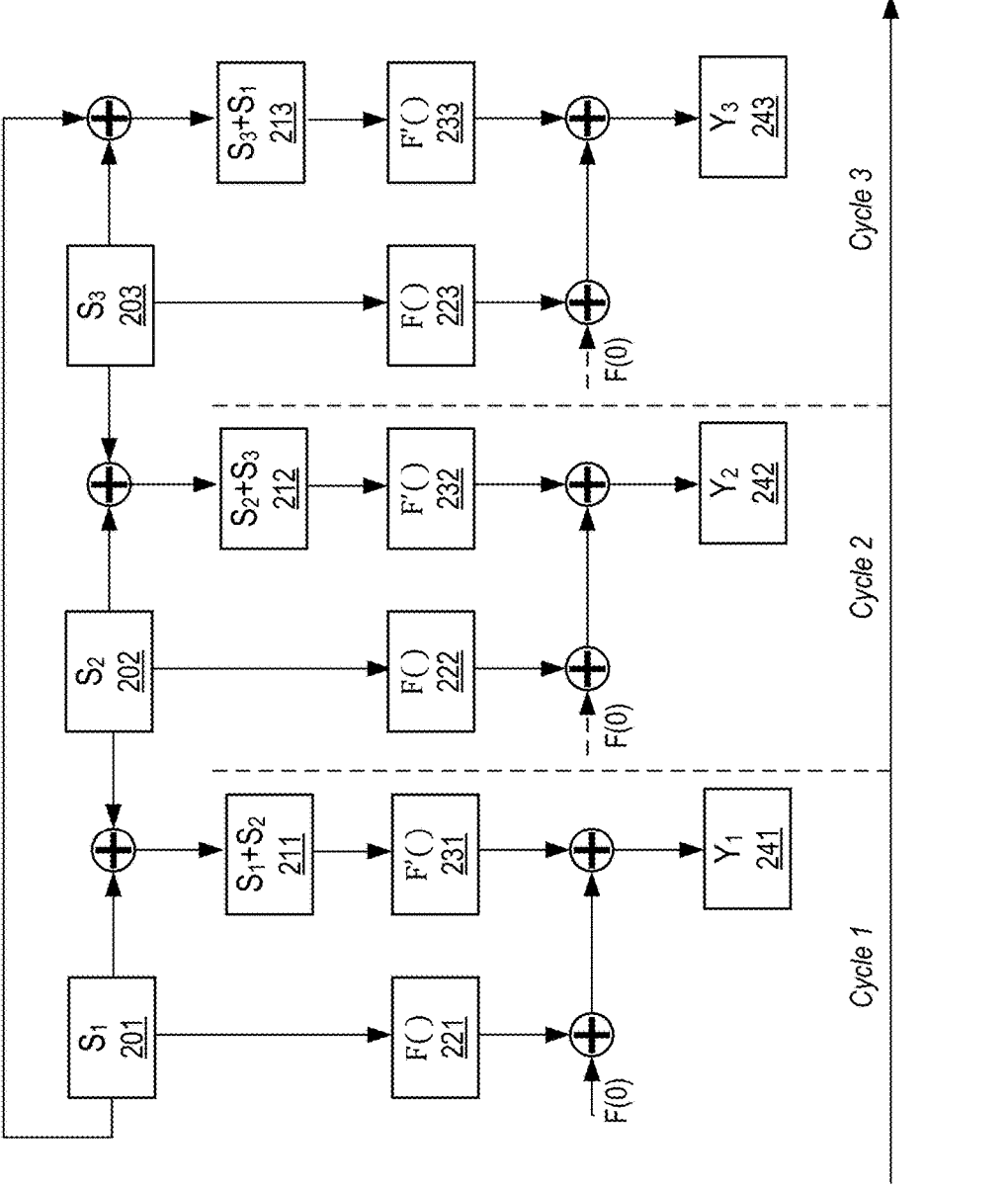
FIG. 2 is a schematic diagram illustrating operations that compute a nonlinear function using an unprotected data path, in accordance with some implementations of the present disclosure.

FIG. 2 is a schematic diagram illustrating operations 200 that compute a nonlinear function using an unprotected data path, in accordance with some implementations of the present disclosure. Operations 200 are illustrated for an instance of three shares, but similar operations may be performed for four, five, and/or any other number of shares. Operations 200 are performed over three iterations, each iteration computing a respective share $Y_j$ of function $F(S)=Y_1+Y_2+Y_3$ (with the constant value F(0) being included in shares $Y_j$). Each iteration may include computations of multiple (e.g., two, in this example) instances of function F( ) performed sequentially over different cycles. Different iterations are performed sequentially with respect to each other. Shares of value S may be stored in any suitable registers 122 accessible to CPU 120 or UDP accelerator 140 or in addresses of system memory 130 (e.g., RAM 134), with reference to FIG. 1.

During the first iteration, shares $S_1$ and $S_2$ may be loaded from respective storing locations 201 and 202, and two instances of function F( ) may be computed. The first instance of the function 221 computes $F(S_1)$ and the second instance of the function 231 computes the function applied to the sum of the two shares $S_1+S_2$ computed at block 211 computed using an addition operation (e.g., XOR operation, in this example). The computed value $F(S_1)$ may be added to the constant value F(0) and then further added to the value $F(S_1+S_2)$ to obtain the first share 241 of F(S): $Y_1=F(0)\oplus F(S_1)\oplus F(S_1+S_2)$.

Similarly, during the second iteration, shares $S_2$ and $S_3$ may be loaded from the respective storing locations 202 and 203, the first instance of the function 222 may compute $F(S_2)$, and the second instance of the function 232 may compute the function F( ) applied to the sum of the two shares $S_2+S_3$ (from block 212). The computed value $F(S_2)$ may be added to value $F(S_2+S_3)$ to obtain the second share 242 of F(S): $Y_2=F(S_2)\oplus F(S_2+S_3)$. During the third iteration, shares $S_3$ and $S_1$ may be loaded from the respective storing locations 203 and 201, and the first instance of the function 223 may compute $F(S_3)$ and the second instance of the function 233 may compute the function applied to the sum of the two shares $S_3+S_1$ (from block 213). The computed value $F(S_3)$ may be added to value $F(S_3+S_1)$ to obtain the third share 243 of F(S): $Y_3=F(S_3)\oplus F(S_3+S_1)$.

Several variations of operations 200 are within the scope of this disclosure. In some implementations, to streamline a data path control flow, the constant values F(0) may also be added (as indicated with the corresponding dashed arrows) during computations of the second share 242 and the third share 243, since the two shares add up to zero $F(0)\oplus F(0)=0$. Instances of the functions 22X and 23X (with X=1, 2, 3) may be performed by a single circuit operating in series or by two different circuits operating in parallel, as disclosed in more detail below.

In some implementations, an additional blinding of shares may be performed to ensure uniformity of shares. The uniformity is a desirable property in cryptographic applications and occurs when uniformly distributed (over a set of various possible values) input shares (e.g., $S_1$, $S_2$, $S_3$) result in uniformly distributed output shares (e.g., $Y_1$, $Y_2$, $Y_3$). Additional blinding (re-randomization) of the shares may be achieved by adding random numbers $R_1$, $R_2$ to any of the two output shares, e.g., $Y_1\oplus R_1\rightarrow Y_1$ and $Y_2\oplus R_2\rightarrow Y_2$, and subtracting (or adding, in case of XOR addition) the sum of the two random numbers from the third share, e.g., $Y_3\oplus R_1\oplus R_2\rightarrow S_3$. Such a sharing requires a re-randomization technique. In some implementations, a sufficient uniformity of shares may be achieved by blinding any two shares while leaving the third share as is: $Y_1\oplus R\rightarrow Y_1$; $Y_2\oplus R\rightarrow Y_2$; $Y_3\rightarrow Y_3$. This has the benefit of only a single random number (rather than two random number) having to be generated per a nonlinear computation, since generation of random numbers is a computationally expensive operation.

Further simplification of blinding may be achieved in case of various cryptographic algorithms, e.g., Keccak, Ascon, Xoodyak, and/or the like, using blinding by bit shifting. For example, the function F( ) in such algorithms may be a compound function $F( )=x \circ L( )$ where L is a linear function and x is an m-bit (e.g., m=3, 5, etc.) substitution box (S-box) operating in parallel on each m-bit group of an input value. For example, the Keccak algorithm may operate on 1600-bit blocks of data using 320 parallel S-boxes each operating on 5-bit strings. Operations 200 of FIG. 2 may then correspond to operations of each of the multiple S-boxes, in which each 5-bit string computations are performed sequentially for groups of three (five, etc.) bits of the input value. Additional blinding may be achieved by adding at least some of the shares that are input into j-th string (or shares of intermediate values encountered during computation of j-th string) to the output of shares for the j-lth string. (Alternatively, inputs or intermediate values of j-th string may be used to blind output shares of more significant strings, e.g., j+l-th string. Any other non-cyclic patterns may also be used.) For example, input shares of the most significant bits S; [1599:1595] may be used to blind output shares of the next most significant bits Y; [1594:1590], e.g., as follows (or in some other suitable pattern), $$Y_1[1594:1590] \oplus S_2[1599:1595] \oplus S_3[1599:1595] \rightarrow Y_1[1594:1590],$$

$$Y_2[1594:1590] \oplus S_3[1599:1595] \rightarrow Y_2[1594:1590],$$

$$Y_3[1594:1590] \oplus S_2[1599:1595] \rightarrow Y_3[1594:1590]$$

such that the sum of all shares $Y_j[1594:1590]$ remains invariant. Similar blinding operations may be performed for other strings of less significant bits, e.g., with (at least some of) input shares $S_j[M+m: M+1]$ used to blind output shares $Y_j[M: M-m+1]$. This accomplished blinding of all bits except the m most significant bits (m=5 in the above example), for which two m-bit random numbers $r_1$ and $r_2$ ("guards") may be generated. For example, for Keccak algorithm blinding:

$$Y_1[1599:1595] \oplus r_1 \oplus r_2 \rightarrow Y_1[1599:1595],$$

$$Y_2[1599:1595] \oplus r_2 \rightarrow Y_2[1599:1595],$$

$$Y_3[1599:1595] \oplus r_1 \rightarrow Y_3[1599:1595]$$

Generating two 5-bit random guards is a computationally much less expensive operation compared with generating one or more 1600-bit random numbers.

The blinding operations may be performed as part of the instances of functions 231, 232, and 233, as indicated via the prime in the notation F'( ) each instance of the blinded function F'( ) obtained by computing the function F( ) and adding (e.g., using XOR operation) the blinding values, e.g., as described in the above example. In some implementations, blinding may be performed using intermediate values encountered in computations of values $F(S_j)$ or $F(S_j+S_k)$. In one illustrative example, function F( ) may have the form $F( )=L \circ Q \circ M( )=L(Q(M( )))$, where L( ) and M( ) are invertible linear functions and Q( ) is an invertible quadratic function that is applied in parallel to m-bit input strings. A linear bit-shifting operation defined as $G( )=L(Shift(M( ))$ where Shift( ) function shifts its input by m bits (to the left or to the right uniformly blinds its output (with the exception of m most significant or m least significant bits, which may be blinded separately). More specifically:

$$Y_1=F(S_1) \oplus F'(S_1 \oplus S_2) \oplus F_0,$$

$$Y_2=F(S_2) \oplus F'(S_2 \oplus S_3) \oplus F_0,$$

$$Y_3=F(S_3) \oplus F'(S_2 \oplus S_3) \oplus F_0,$$

where $F'(S_j \oplus S_k)=F(S_j \oplus S_k) \oplus G(S_j \oplus S_k)$; and the constant term is optionally included in the computations of each output share Y. Computation of the blinded function F'( ) may be performed by the same circuit as function F( ) since both functions use the same combined input $S_j \oplus S_k$, rather than separately operating on the shares $S_j$ and $S_k$. An additional advantage of the disclosed blinding technique is that the blinding function G( ) need not be computed separately from F( ) and may be computed by replacing Q(x) with $Q(x) \oplus Shift(x)$ at an intermediate step in computation of F. Adding F(0) is often a sparse addition that does not require complex computations. A single circuit may be capable of computing both F( ) or F'( ) subject to a control input, e.g., making the addition of the blinding function G( ) and, optionally, constant value F(0) conditional on the control input.

Figure 3A:
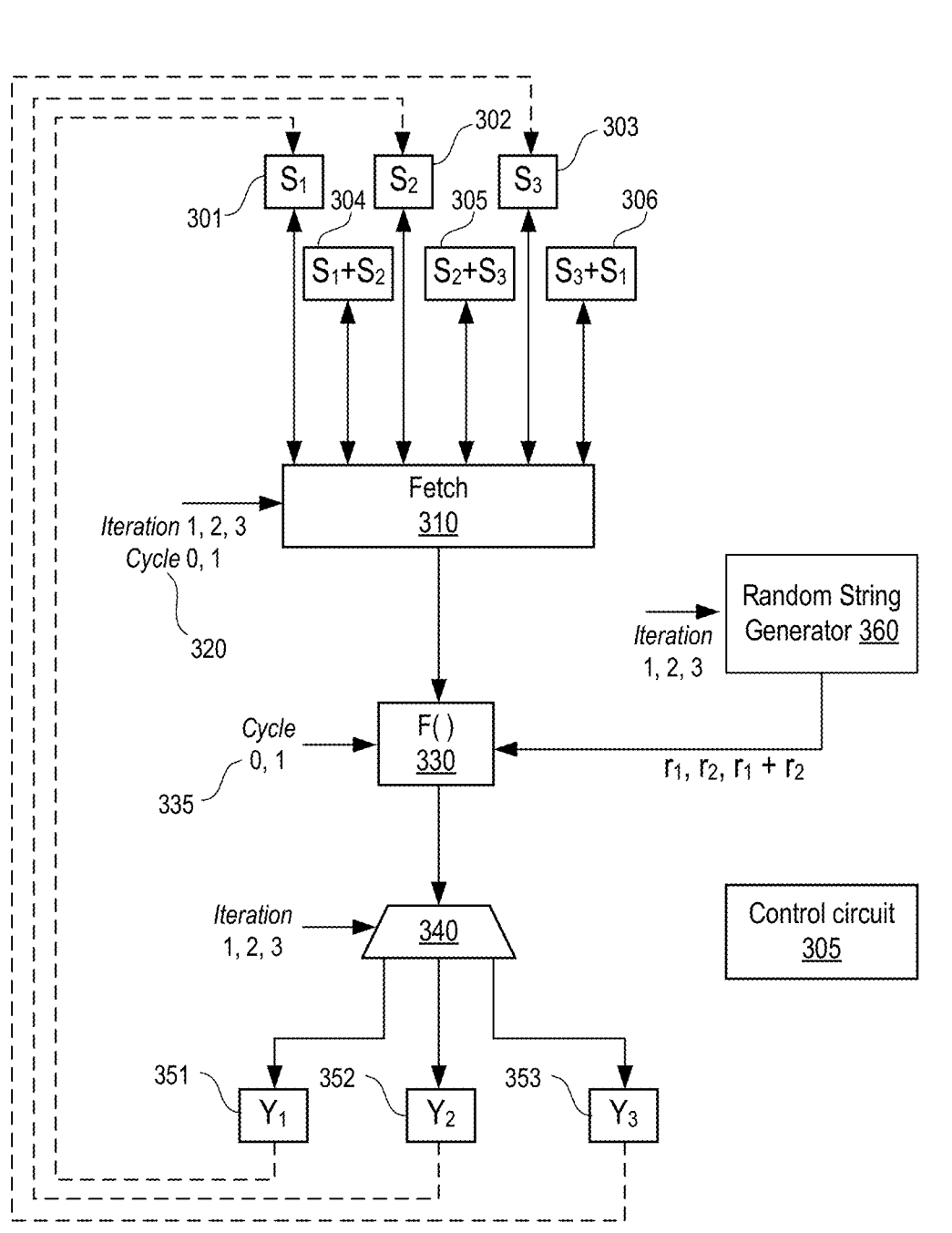
FIG. 3A is an example diagram of a cryptographic circuit that performs sequential computation of a nonlinear function using a unified unprotected data path, in accordance with some implementations of the present disclosure.

FIG. 3A is an example diagram of a cryptographic circuit 300 that performs sequential computation of a nonlinear function using a unified unprotected data path, in accordance with some implementations of the present disclosure. Cryptographic circuit 300 performs each of three consecutive iterations of operations 200 using a single circuit (e.g., function circuit 330) executing two instances of a quadratic function F( ) per iteration, the two instances being performed in series, e.g., over two cycles. Accordingly, cryptographic circuit 300 is capable of computing all three shares $\{Y_j\}$ of function $F(S_1+S_2+S_3)=Y_1+Y_2+Y_3$ using six instances of function F( ) computed in series, e.g., over six cycles. Shares $S_1$, $S_2$, and $S_3$ may be stored in respective registers 301, 302, and 303 and the sums of shares $S_1+S_2$, $S_2+S_3$, and $S_3+S_1$ may be stored in respective registers 304, 305, and 306, respectively. The sums of shares may be computed using one or more adder circuits (not shown in FIG. 3A). A fetch circuit 310 may select share $S_1$ and the sum $S_1+S_2$ during the two cycles (e.g., cycle 0 and cycle 1) of the first iteration, share $S_2$ and the sum $S_2+S_3$ during the two cycles of the second iteration, and share $S_3$ and the sum $S_3+S_1$ during the two cycles of the third iteration, responsive to respective control input 320. Operations of fetch circuit 310 may be secure data fetches, such that no more than two shares are simultaneously fetched during a given iteration. Fetch circuit 330 provides fetched shares and/or sums of shares to function circuit 330. Responsive to control input 335, function circuit 330 computes values F( ) during cycles 0 and values F'( ) during cycles 1 of each iteration. More specifically, function circuit 330 computes value $F(S_1)$ during the first cycle of the first iteration, value $F'(S_1+S_2)$ during the second cycle of the first iteration, value $F(S_2)$ during the first cycle of the second iteration, and so on.

The computed values may be directed by a demultiplexer 340 to one of accumulator registers 351 (during both cycles of the first iteration), 352 (during both cycles of the second iteration), and 353 (during both cycles of the third iteration). A value delivered by demultiplexer 340 is being added to a value stored in iteration-specific accumulators 351, 352, 353 and the sum may be used to overwrite the stored value. The computed shares $Y_1$, $Y_2$, $Y_3$ may then be moved from accumulators 351-353 to registers 301-303 before the next operation is performed. In some implementations, accumulators 351-353 may be the same as registers 301-303.

Blinding of shares $Y_1$, $Y_2$, $Y_3$ may be performed using a random string generator 360, which generates m-bit strings for blinding of the most significant bits of each value F'( ) As disclosed above in conjunction with FIG. 2, other m-bit strings of F'( ) may be blinded using intermediate values, e.g., values G( ) computed as part of computation of nonlinear function F( ) e.g., a combination of linear operations of nonlinear function F( ) for adjacent m-bit strings of F'( ) The end m-bit strings of F'( ) may be blinded using two or more random m-bit strings generated by random string generator 360. For example, if two m-bit random values $r_1$ and $r_2$ are generated, random string generator may output string $r_1$ during the first iteration (used during cycle 1), string $r_2$ during the second iteration, and string $r_1 + r_2$ during the third iteration. Additionally, during each cycle 1, function circuit 330 may add a constant value F(0) to the output. As a result, during the first cycle of the first iteration, cryptographic circuit 300 begins computation of the first share by computing $$F(S_1) \rightarrow Y_1,$$

and during the second cycle of the first iteration, cryptographic circuit 390 completes the computation of the first blinded share by computing $$Y_1 \oplus F'(S_1 + S_2) \oplus F(0) \rightarrow Y_1.$$

Similarly, blinded shares $Y_2$ and $Y_3$ are computed during the second iteration and the third iteration, respectively.

Figure 3B:
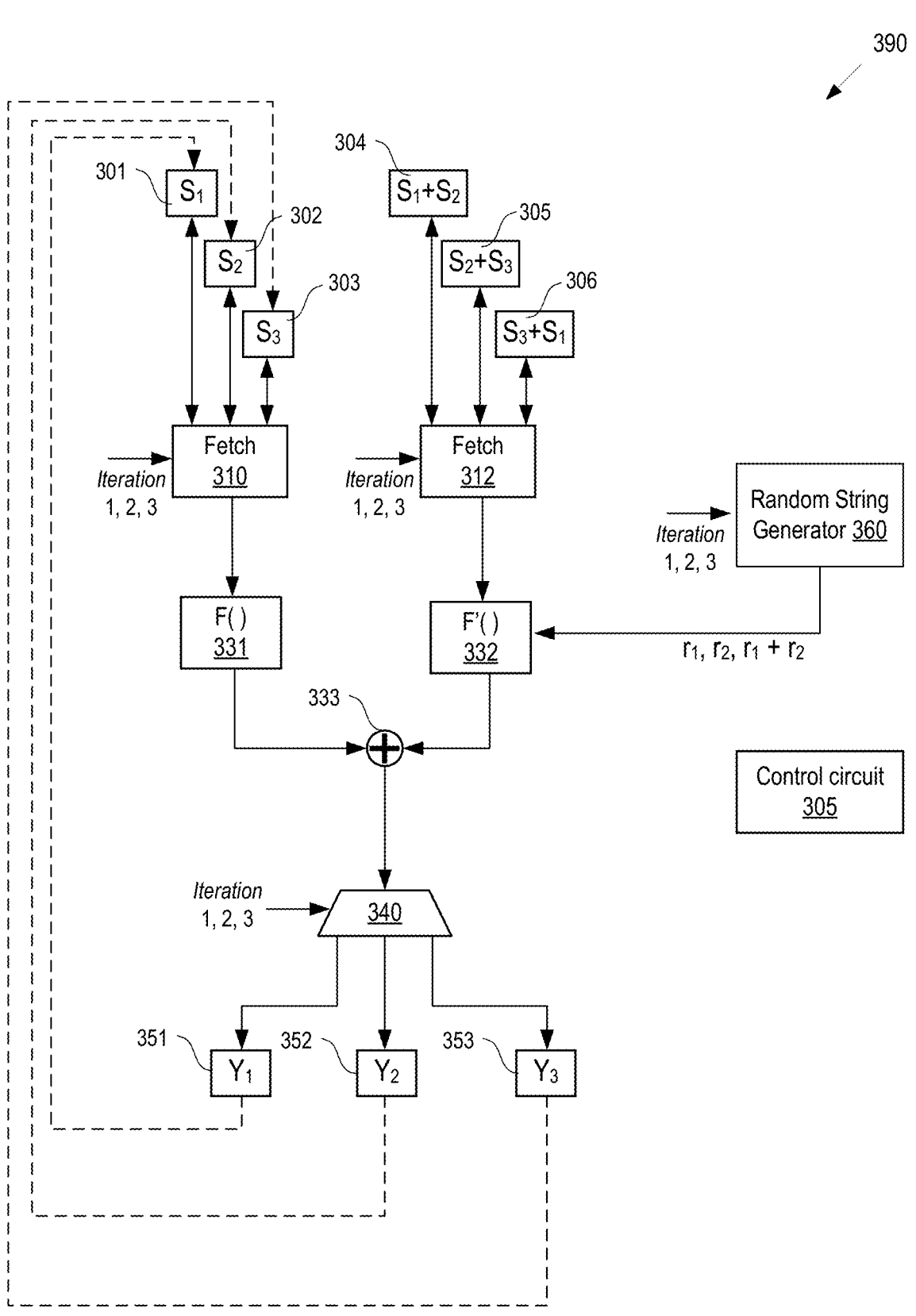
FIG. 3B is an example diagram of another cryptographic circuit that performs sequential computation of a nonlinear function using a unified unprotected data path, in accordance with some implementations of the present disclosure.

FIG. 3B is an example diagram of another cryptographic circuit 390 that performs sequential computation of a nonlinear function using a unified unprotected data path, in accordance with some implementations of the present disclosure. Cryptographic circuit 390 performs each of three consecutive iterations of operations 200 using two instances of quadratic function F( ) performed in parallel whereas cryptographic circuit 300 uses two instances per iteration performed in series. In particular, during the first iteration, a first instance of the function 331 computes value $F(S_1)$ and a parallel second instance of the function 332 computes value $F'(S_1 + S_2)$, or $F'(S_1 + S_2) \oplus F(0)$. Similar computations are performed during other iterations. Adder circuit 333 computes the value of the first share: $Y_1 = F(S_1) \oplus F'(S_1 + S_2) \oplus F(0)$. Similarly, cryptographic circuit 390 computes values of the other shares $Y_2$ and $Y_3$ during the remaining two iterations. To speed up share fetching, cryptographic circuit 390 may use multiple fetch circuits 310 and 312, e.g., fetch circuit 310 to fetch shares $S_j$ during and fetch circuit 312 to fetch sums of shares $S_j + S_k$. Operations of fetch circuits 310 and 312 may be secure data fetches, such that no more than two shares (or their combinations) are simultaneously fetched by the two fetch circuits during any given iteration, e.g., $S_1$ and $S_2$ (but not $S_3$) during the first iteration. Cryptographic circuit 300 of FIG. 3A and cryptographic circuit 390 of FIG. 3B may also be used for unprotected data processing. For example, during processing of unprotected data with cryptographic circuit 300 of FIG. 3A, the unprotected input data may be stored (e.g., as a single share $S_1$) in register 301, and the control signal into fetch circuit 310 may select this unprotected data $S_1$. During processing of unprotected data with cryptographic circuit 390 of FIG. 3B, the input data may likewise be stored in register 301 and fetched by fetch circuit 310. The second instance of function 332 may output a zero value, $F(0) \oplus F(0) = 0$, as a result of fetch circuit 312 selecting zero input, which may be stored in register 304.

In both implementations of cryptographic circuit 300 and cryptographic circuit 390, random string generator 360 may be deactivated during processing of unprotected data.

In some implementations, more than two circuits computing multiple instances of the functions F( ) and/or F'( ) in parallel may be deployed, e.g., up to six different circuits in the quadratic function illustration of FIGS. 3A and 3B. More circuits may be used for higher order functions and/or more shares. For example, quadratic function computations protected with five shares may include five iterations (e.g., as illustrated earlier in this disclosure), each iterations having three instances of function F( ) and three instances of function F'( ) Correspondingly, the quadratic computations may be performed using a single quadratic function circuit (computing six instances of the quadratic function over the same number of cycles during each of the five iterations), two quadratic function circuits (each circuit computing three instances of the quadratic function over the same number of cycles during each of the five iterations), six quadratic function circuits (each circuit computing one instance of the quadratic function over a single cycle during each of the five iterations), and so on, up to thirty circuits (able to compute all shares over a single cycle).

Although, for brevity and conciseness, quadratic functions were used above as an illustration, similar techniques may be used for protecting and blinding computations of nonlinear functions of higher algebraic order, e.g., a cubic function, a quartic function, and so on. The number of computations increases exponentially with the order of the nonlinear function.

The techniques disclosed above may also be implemented in a software code executed by a general-purpose processor, e.g., CPU 120. For example, a code ("round code") may implement a round of a cryptographic function (e.g., a round of a cipher, hash function, sponge function, etc.). Any software program may call the round code while processing data. For example, if M is the number of rounds of the cryptographic function and N is the number of shares used to protect secure data, the software program may call the round code M×N times when applying the cryptographic function to a secure data. The calls may be executed in series or as M batches of N parallel calls per batch. When applying the cryptographic function to a public data, which is not split into shares, the software program may call the round code M times.

In some implementations, a combination of a software code and a hardware accelerating circuit may be used. For example, the processing circuit may be a circuit computing function F( ) or a circuit capable of computing both the function F( ) and its blinded instance F'( ) A software program may compute other operations of a cryptographic function (including various linear functions) directly while computing the values of the function F( ) and/or function F'( ) on the hardware accelerating circuit.

FIG. 4 is a flow diagram of an example method 400 of operating a cryptographic processor for processing of both unprotected data and protected data using an unprotected data path, in accordance with some implementations of the present disclosure. Method 400 and/or each of its individual functions, routines, subroutines, or operations may be performed by a suitable cryptographic accelerator (cryptographic processor), such as UDP accelerator 140 of FIG. 1, cryptographic circuit 300 of FIG. 3A, cryptographic circuit 390 of FIG. 3B, or any other similar processing device. In some implementations, method 400 may be performed by a general-purpose processor, such as CPU 120 of FIG. 1. Various blocks of method 400 may be performed in a different order compared with the order shown in FIG. 4. Some operations may be performed concurrently with other operations. Some operations may be optional. In some implementations, at least some operations of method 400 may be performed in parallel, each parallel thread executing one or more individual functions, routines, subroutines, or operations of the methods. In some implementations, parallel threads implementing method 400 may be synchronized (e.g., using semaphores, critical sections, and/or other thread synchronization mechanisms). Alternatively, threads implementing method 400 may be executed asynchronously with respect to each other. Various operations of method 400 may be performed in a different order compared with the order shown in FIG. 4. Some operations of method 400 may be performed concurrently with other operations. In some implementations of method 400, one or more operations shown in FIG. 4 are not always performed.

A cryptographic processor performing method 400 may be selectively configurable into a plurality of modes. In a public mode, the cryptographic processor may be processing public (unprotected) data, e.g., any public data, public keys, and the like. In a secure mode, the cryptographic processor may be processing secure (protected) data, e.g., any encrypted data, secret keys, and the like. At block 410, method 400 may include receiving, by the cryptographic processor, a first input data. The first input data may be retrieved from any memory device, provided by a general-purpose processor, received from any applicable device over a bus, network, direct memory access (DMA), and/or via any other suitable mechanisms. At block 420, the cryptographic processor may determine that the first input data is secure data and, responsive to this determination, operate in the secure (protected) mode.

At block 430, method 400 may include performing a plurality of rounds of a cryptographic function. In some implementations, the cryptographic function may be (or include) a hash function, a block cipher, a stream cipher, a sponge construction, an authentication code, and/or the like. In some implementations, the cryptographic function may be (or include) a Keccak cipher, Ascon cipher, Simon cipher, or Xoodyak cipher, and/or the like. In some implementations, each of the plurality of rounds may generate a round output (e.g., intermediate data output by a specific round). The round output may be based on a round input (e.g., intermediate data output by the respective round). The round input into the first round may be based on the first input data. The round input into the second (third, etc.) round may be based on a round output of a previous round. In some embodiments, the round input into nth round may differ from the round output of n-1th round (e.g., be modified by a round key, a pseudorandom number, or some other data).

In some implementations, performing each of the plurality of rounds may include performing operations indicated in the callout portion of FIG. 4. More specifically, each of the plurality of rounds may include performing a plurality of sequential iterations. The number of iterations may be determined by a number of shares used to protect secure data. As indicated with block 432, each iteration may include applying a set of computational operations to the round input to obtain a respective share of the round output. In some implementations, applying the set of computational operations of each round may include sequentially performing multiple instances of a nonlinear function (e.g., function F( ) FIG. 2 and FIG. 3A-B). In some implementation, at each iteration, the cryptographic accelerator may apply the multiple instances of the computational operation to a sub-plurality of fewer than a total number of shares of the round input. For example, at an iteration that computes a first share of the round output $Y_1$, the computational operations (e.g., instances of computation of a nonlinear function F( ) may be applied to the subset of round inputs $S_1$ and $S_2$, but not to $S_3$.

In some implementations, method 400 may include, at block 434, blinding the plurality of shares of the round outputs of at least one of the rounds. In some implementations, blinding of the shares of the round outputs may be performed for all rounds. In some implementations, blinding the plurality of shares of a particular round output may include modifying the shares of the round output using one or more random numbers. In some implementations, blinding the plurality of shares may include modifying the shares of the round output with portions of shares of the round input or intermediate round values at shifted bit positions relative to the plurality of shares of the round output, e.g., intermediate round values $G(S_j \oplus S_k) = L(\text{Shift}(M \ (S_j \oplus S_k)))$, as described above in conjunction with FIG. 2 and FIG. 3A.

In some implementations, method 400 may include, at block 440, the cryptographic processor receiving a second input data. At block 450, method 400 may include determining that the second input data is public data. At block 460, method 400 may continue with performing, by the cryptographic processor operating in the public mode, the plurality of public rounds of the cryptographic function. Each of the plurality of public rounds may include applying a subset of the set of computational operations to the round input.

As one illustrative example, the cryptographic function may include any number of rounds that involve computing a quadratic function $F(S_{round})$ of round input data $S_{round}$. When secure data is being processed, each round may include a number of iterations equal to the number of shares (e.g., three, four, five, etc.). Each iteration may include a set of computational operations, which includes computing six instances of the quadratic function (e.g., if secure data is protected by splitting into three shares), fifteen instances of the quadratic function (if secure data is protected by splitting into five shares), e.g., as described in more detail in conjunction with FIG. 1). When public data is being processed, each round may be performed by applying a subset of the set of computational operations, e.g., by compute a single instance of the function F( ).

Figure 5:
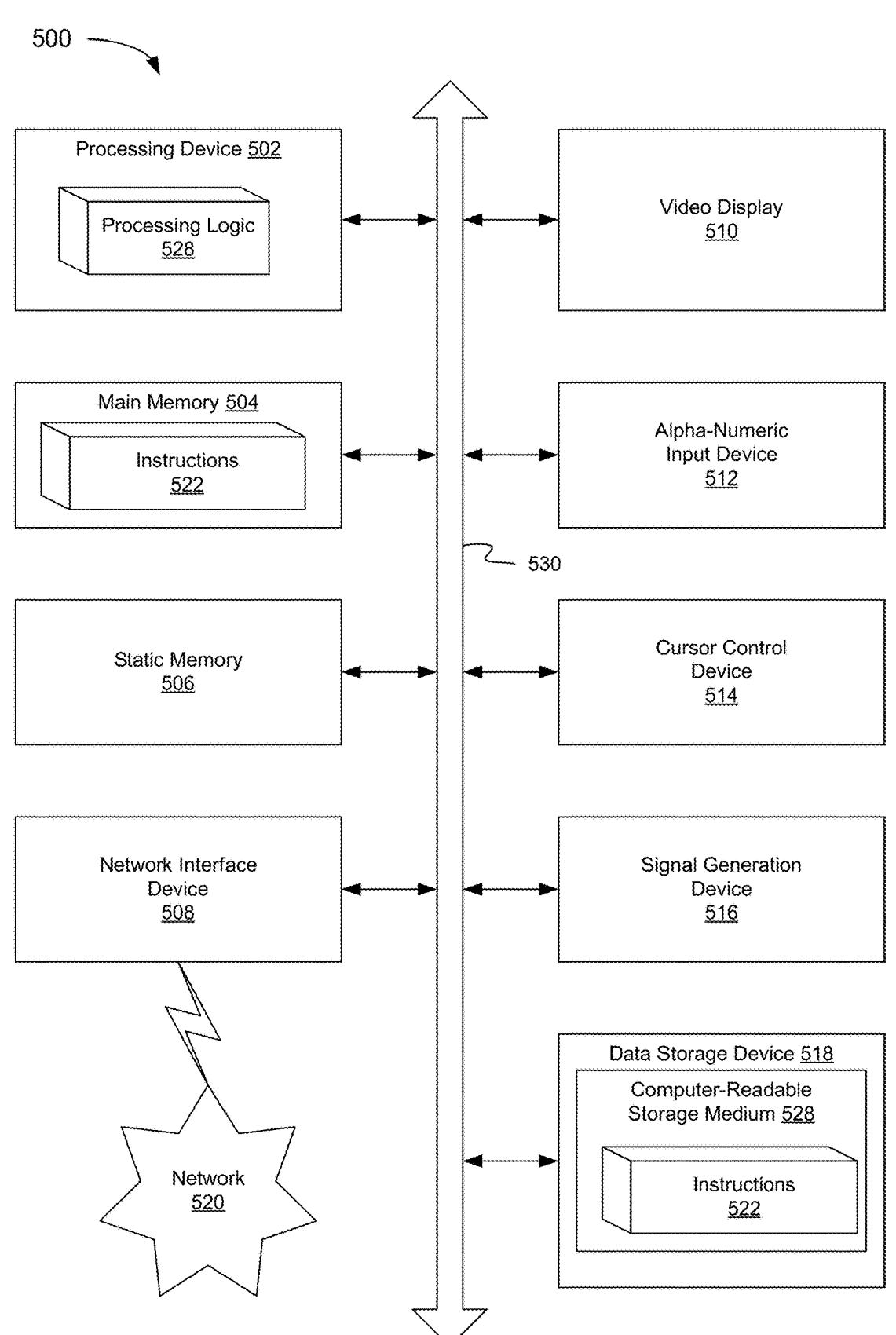
FIG. 5 depicts a block diagram of an example computer system operating in accordance with one or more aspects of the present disclosure.

FIG. 5 depicts a block diagram of an example computer system 500 operating in accordance with one or more aspects of the present disclosure. In various illustrative examples, example computer system 500 may include example computer system 100, illustrated in FIG. 1. Example computer system 500 may be connected to other computer systems in a LAN, an intranet, an extranet, and/or the Internet. Computer system 500 may operate in the capacity of a server in a client-server network environment. Computer system 500 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 500 may include a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processing device 502 represents one or more general-purpose processing devices such as a microprocessor, central processing unit, or the like. More particularly, processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 may be configured to execute instructions implementing method 400 of operating a cryptographic processor for processing of both unprotected data and protected data using an unprotected data path.

Example computer system 500 may further comprise a network interface device 508, which may be communicatively coupled to a network 520. Example computer system 500 may further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 may include a computer-readable storage medium (or, more specifically, a non-transitory computer-readable storage medium) 526 on which is stored one or more sets of executable instructions 522. In accordance with one or more aspects of the present disclosure, executable instructions 522 may comprise executable instructions implementing method 400 of operating a cryptographic processor for processing of both unprotected data and protected data using an unprotected data path.

Executable instructions 522 may also reside, completely or at least partially, within main memory 504 and/or within processing device 502 during execution thereof by example computer system 500, main memory 504 and processing device 502 also constituting computer-readable storage media. Executable instructions 522 may further be transmitted or received over a network via network interface device 508.

While the computer-readable storage medium 526 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMS, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A cryptographic processor comprising:

a processing unit; and a control unit to cause the processing unit to compute a cryptographic function of an input data using a plurality of rounds, each of the plurality of rounds operating on a round input comprising at least one of (1) the input data or (2) an output of a previous round of the plurality of rounds, wherein the control unit is to selectively cause the processing unit to operate in at least a first mode or a second mode:

wherein the processing unit operating in the first mode is to use a computational operation to obtain, based on the round input, a round output; and wherein the processing unit operating in the second mode is to perform a plurality of sequential iterations, wherein at each iteration, the processing unit is to use multiple instances of the computational operation to obtain, based on the round input, a respective share of a plurality of shares of the round output.

2. The cryptographic processor of claim 1, wherein the cryptographic function comprises at least one of a hash function, a block cipher, a stream cipher, a sponge construction, or an authentication code.

3. The cryptographic processor of claim 1, wherein the cryptographic function comprises at least one of Keccak cipher, Ascon cipher, Simon cipher, or Xoodyak cipher.

4. The cryptographic processor of claim 1, wherein the computational operation computes a function of the round input, wherein the function has an algebraic degree of two or three.

5. The cryptographic processor of claim 1, wherein in the second mode, the processing unit is further to perform, for one or more rounds of the plurality of rounds, blinding of the plurality of shares of the round output.

6. The cryptographic processor of claim 5, wherein to perform blinding of the plurality of shares of the round output, the processing unit is to modify the shares of the round output using at least one of:

one or more random numbers, portions of shares of the round input at shifted bit positions relative to the plurality of shares of the round output, or portions of shares of an intermediate round value at shifted bit positions relative to the plurality of shares of the round output.

7. The cryptographic processor of claim 1, wherein at each iteration, the processing unit is to apply the multiple instances of the computational operation to a sub-plurality of fewer than a total number of shares of the round input.

8. The cryptographic processor of claim 1, wherein at each iteration, the multiple instances of the computational operation are performed sequentially.

9. The cryptographic processor of claim 1, wherein the control unit is to select:

the first mode, responsive to the input data being public data, or the second mode, responsive to the input data being secure data.

10. A processor comprising:

a processing unit configurable into any one of a plurality of modes, the plurality of modes comprising a first mode and a second mode; and a control unit to selectively cause the processing unit to operate in said any one of the plurality of modes, wherein in the first mode, the processing unit is to perform a computational operation to compute a nonlinear function of a public data; and wherein in the second mode, the processing unit is to compute, over a plurality of iterations, a plurality of shares of the nonlinear function of a secure data, wherein at each iteration of the plurality of iterations, the processing unit is to perform multiple instances of the computational operation to compute a respective share of the nonlinear function of the secure data.

11. The processor of claim 10, wherein the computational operation is performed as part of a cryptographic computation that comprises at least one of a hash function, a substitution box (S-box), a block cipher, a stream cipher, a sponge construction, or an authentication code.

12. The processor of claim 10, wherein the computational operation is performed as part of at least one of Keccak cipher, Ascon cipher, Simon cipher, or Xoodyak cipher.

13. The processor of claim 10, wherein the computational operation computes a function of an algebraic degree of two or three.

14. The processor of claim 10, wherein in the second mode, the processing unit is further to perform blinding of the plurality of shares of the nonlinear function of a secure data.

15. The processor of claim 10, wherein at each iteration of the plurality of iterations, the processing unit is to restrict application of the multiple instances of the computational operation to fewer than a total number of shares of the secure data.

16. A method comprising:

receiving, by a cryptographic processor, a first input data, wherein the cryptographic processor is selectively configurable into a plurality of modes, wherein a secure mode of the plurality of modes is associated with processing of secure data, and wherein a public mode of the plurality of modes is associated with processing of public data;

responsive to determining that the first input data is secure data, performing, by the cryptographic processor operating in the secure mode, a plurality of rounds of a cryptographic function, each of the plurality of rounds generating a round output based on a round input, wherein the round input is based on at least one of the first input data or a round output of a previous round of the plurality of rounds, wherein performing each of the plurality of rounds comprises:

performing a plurality of sequential iterations, wherein each iteration comprises applying a set of computational operations to the round input to obtain a respective share of a plurality of shares of the round output.

17. The method of claim 16, further comprising:

blinding, for one or more rounds of the plurality of rounds, the plurality of shares of the round output.

18. The method of claim 17, wherein blinding the plurality of shares of the round output comprises:

modifying the shares of the round output using at least one of:

one or more random numbers, portions of shares of the round input at shifted bit positions relative to the plurality of shares of the round output, or portions of shares of an intermediate round value at shifted bit positions relative to the plurality of shares of the round output.

19. The method of claim 16, wherein applying the set of computational operations of each round comprises sequentially performing multiple instances of a nonlinear function.

20. The method of claim 16, further comprising:

receiving, by the cryptographic processor, a second input data; and responsive to determining that the second input data is public data, performing, by the cryptographic processor operating in the public mode, a plurality of public rounds of the cryptographic function, wherein each of the plurality of public rounds comprises:

applying a subset of the set of computational operations to the round input.

\* \* \* \* \*